July 23, 1968 F. M. HALL 3,393,936
COLLAPSIBLE STATION WAGON TRUNK
Filed Aug. 19, 1966 2 Sheets-Sheet 1

INVENTOR.
Francis M. Hall
BY
Semmes & Semmes
ATTORNEYS

July 23, 1968     F. M. HALL     3,393,936
COLLAPSIBLE STATION WAGON TRUNK
Filed Aug. 19, 1966     2 Sheets-Sheet 2
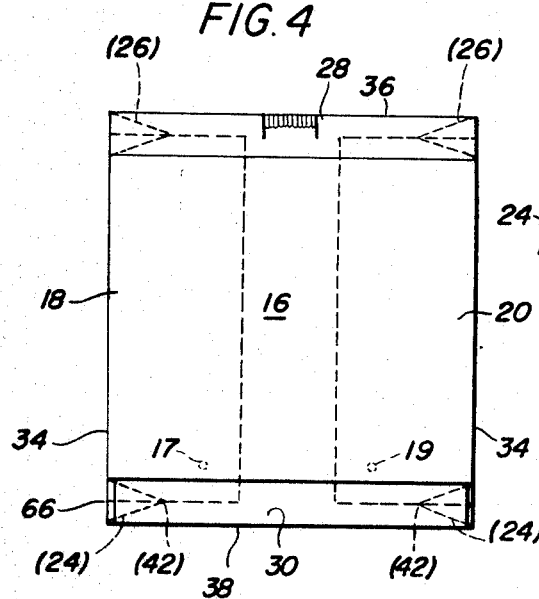
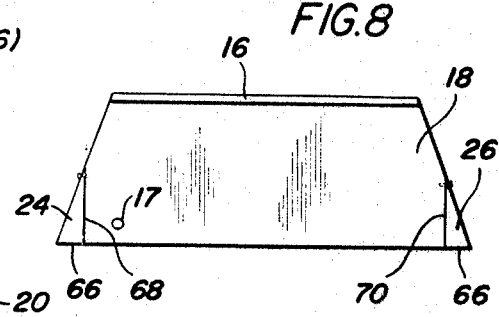
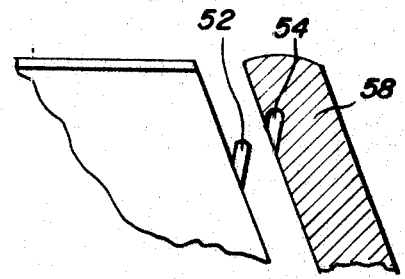
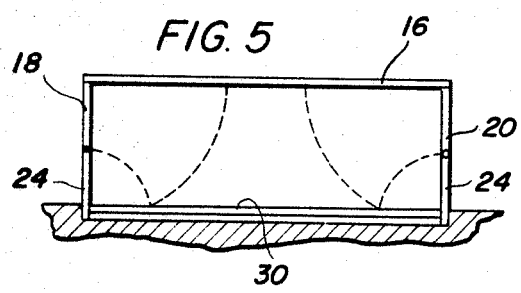
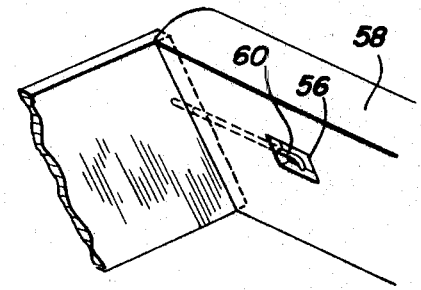
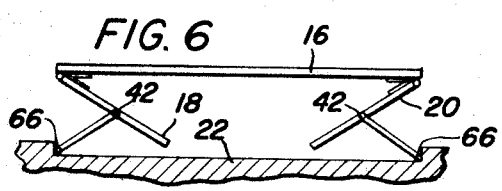
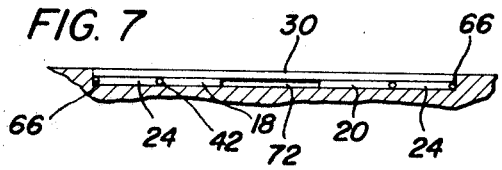
INVENTOR.
Francis M. Hall
BY
Semmes & Semmes
ATTORNEYS

United States Patent Office 3,393,936
Patented July 23, 1968

3,393,936
COLLAPSIBLE STATION WAGON TRUNK
Francis M. Hall, 468 Goodspeed Road,
Virginia Beach, Va. 23451
Filed Aug. 19, 1966, Ser. No. 573,654
10 Claims. (Cl. 296—24)

ABSTRACT OF THE DISCLOSURE

Trunk forming apparatus of the type adapted for collapse within the rear of an automotive vehicle, particularly a trunk adapted for collapse within a station wagon floor intermediate the station wagon rear seat and tail gate and including a top supported parallelly with the station wagon floor by means of side, front and back panels which are pivotable vertically to a position of support beneath the top.

---

The present application is related to a trunk adapted for collapse within the rear of an automotive vehicle, particularly a trunk adapted for collapse within a station wagon floor intermediate the station wagon rear seat and tail gate.

Numerous previous inventors have attacked the problem of providing a closed compartment or trunk within a station wagon rear. For the most part, these constructions have included elaborate guiding tracks and mechanical linkage precluding convenient collapse and storage of the trunk when not in use. Many of these trunks have been incapable of collapse, others were not sufficiently collapsible to the extent that the station wagon rear portion could be used conventionally.

According to the present invention, there is provided a trunk which is built into the station wagon rear and is totally collapsible so as to be flush with the station wagon floor when not in use. When extended to its open position, the trunk is integrally supported intermediate the station wagon rear seat back and the inner face of the station wagon tail gate. Means locking the trunk with the rear seat and the tail gate and the trunk members with each other provided.

Accordingly, it is an object of invention to provide a trunk adapted for collapse witin an automotive vehicle rear.

Another object of invention is to provide a tank adapted for total collapse within a station wagon rear floor.

Yet, additional objects of invention will become apparent from the ensuing specification and attached drawings wherein.

Figure 2:
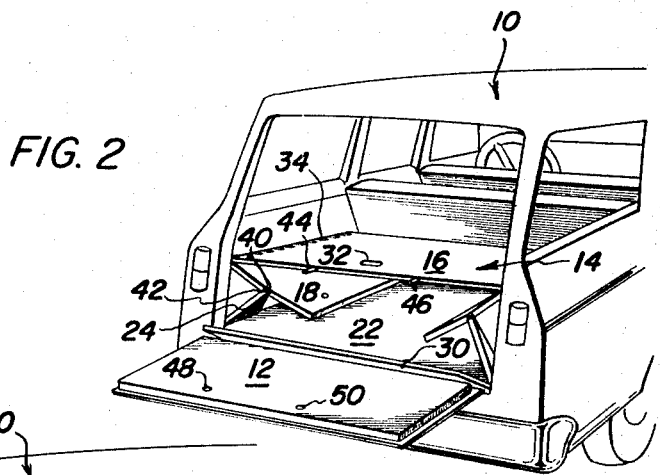
FIG. 2 is a fragmentary perspective showing the trunk assembly in its half way extended or collapsed position, the side members being shown in an attitude of horizontal folding beneath the descending top.
Figure 3:
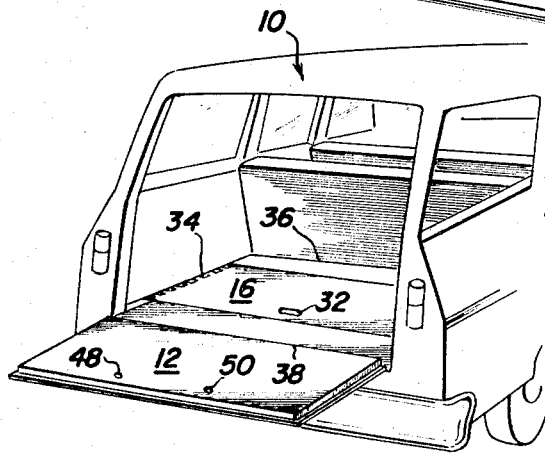
FIG. 3 is a fragmentary perspective showing the col-.apsible trunk assembly in its attitude of collapse within a well in the station wagon rear floor.

FIG. 4 is a top plan of the assembly, showing the front and rear transverse flaps 28 and 30 folded in the same plane as the top 16 and in phantom showing the sides 18 and 20 folded beneath top 16;

FIG. 5 is an end elevation showing the sides vertically extended and supporting top 16;

FIG. 6 is an end elevation, similar to FIG. 2;

FIG. 7 is a vertical section showing the trunk elements folded within the vehicle rear floor;

FIG. 8 is a vertical elevation of a single side member, in an attitude of vertical extension, lower leading and trailing edges complementally engaging front and rear auxiliary side pieces 26 and 24;

FIG. 9 is a fragmenatry cross-section showing the side member leading edge locking stud 52 extending to engage locking slot 54 in the vehicle rear seat back; and FIG. 10 is a fragmentary perspective showing a modification wherein the vehicle rear seat back has a locking pin 60 extensible into the side member leading portion.

Figure 1:
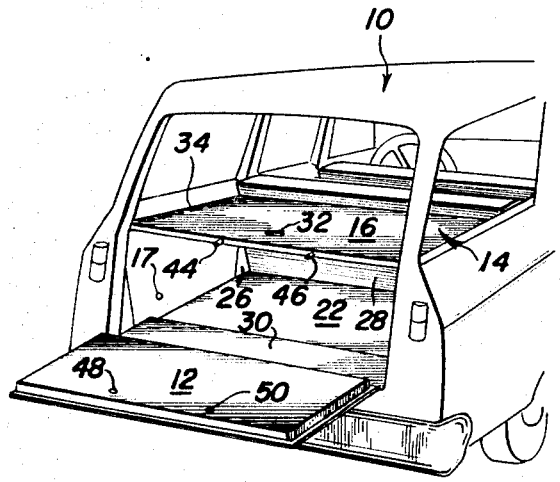
FIG. 1 is a fragmentary, perspective view, showing the trunk in its open or extended position, the rear transverse flap being folded horizontally to its position of transverse support between the sides.

In FIG. 1, station wagon 10 is illustrated as having its tail gate 12 opened so as to show collapsible trunk 14 in a position of vertical extensibility.

Trunk 14 is comprised of foldable side members 18 and 20 depending from top 16 by piano hinges 34 or the like, and foldable in horizontal parallel, as illustrated in FIGS. 4 and 7.

Auxiliary side pieces 24 and 26 are secured by means of hinges 66 to the station wagon bottom. Their tops may be pivotally connected by a torsion spring means 42 or the like to a stud or axle 40. Side pieces 18 and 20 may have finger engaging holes 17 and 19. Manifestly, a short locking stud or its equiavlent may be provided instead of an axle. Also, torsion spring means may be positioned elsewhere in the assembly, for example, at hinges 34 or 66. Front auxiliary piece 26 trailing edge 70 and rear auxiliary piece 24 leading edge 68 complementally engage truncated lower portions of the side member leading and trailing edges, as illustrated in FIG. 8.

Front transverse flap 28 is connected to the floor bottom by means of hinge 36 and rear transverse flap 30 is connected to the floor by hinge 38. In a postiion of vertical extensibility, rear flap 30 is positioned intermediate side members 18 and 20 for transverse stability and front flap 38 is supported forwardly of the front ends of side pieces 18 and 20.

Trunk top 16 may have a hand engaging recess 32 adjacent its trailing edge to enable lifting and collapsing of the entire assembly. Also, locking studs 44 and 46 may project from top 16 trailing edge for complemental engagement with locking recesses 48 and 50 in the trail gate 12.

Side member 18 and 20, as illustrated in FIG. 9, may have locking pins or studs 52 projecting from their leading edges for complemental engagement with the station wagon rear seat 58 locking slot 54. A modification is shown in FIG. 10 wherein rear seat 58 has a laterally extensible locking pin 60 accessible through recess 56 in the rear side of seat 58. As will be apparent, the trunk is not accessible and cannot be collapsed unless the rear tail gate is open. This ensures locking of the entire compartment, as long as tail gate 12 is closed.

As illustrated in FIG. 7, the entire assembly when collapsed falls within well 22 in the bottom of the rear floor, a void 72 being defined between the flattened side members 18 and 20 beneath top 16.

Manifestly, various modifications may be made in the mode of hinging and pivoting the parts with respect to each other without departing from the spirit and scope of invention, as defined in the subjoined claims.

I claim:

1. A trunk forming apparatus adapted for collapse within the floor of an automotive vehicle, comprising:
   (A) a top supportable parallelly with said floor;
   (B) side members hingedly depending from each laterally opposite side of said top, each said side member being foldable horizontally beneath and in parallel with said top and being pivotable vertically to a position of support beneath said top; and (C) front and back transverse members hingedly connected to said floor so as to be foldable horizontally in the same plane with said top, with said back transverse member being foldable horizontally to a position of transverse support between said sides, and said front transverse member being vertically pivotable so as to abut the front ends of the sides.

2. A trunk adapted for collapse within the floor of an automotive vehicle as in claim 1, including front and rear auxiliary side pieces hinged at their base to said floor at each of said side member leading and trailing edge and being pivoted at their tops to said side member leading and trailing edges, so as to guide folding and extension of said side members.

3. A trunk adapted for collapse within the floor of an automotive vehicle as in claim 2, including damping means interconnecting said auxiliary side pieces and said side members.

4. A trunk adapted for collapse within the floor of an automotive vehicle as in claim 3, said top, side members, front and back members and auxiliary side pieces being foldable horizontally within a well defined in said floor.

5. A trunk adapted for collapse within the floor of an automotive vehicle as in claim 4, said side members being truncatedly adapted for vertical extension between vehicle seat back at their leading edges and a tail gate at their trailing edges.

6. A trunk adapted for collapse within the floor of an automotive vehicle as in claim 5, said side members including locking studs extending from their leading edges for complemental engagement with locking recesses in the auto seat back.

7. A trunk adapted for collapse within the floor of an automotive vehicle as in claim 5, including locking means extensible transversely through said vehicle seat back and into a complemental recess within a leading portion of each of said side members.

8. A trunk adapted for collapse within the floor of an automotive vehicle as in claim 5, said top having studs extending rearwardly from its trailing edge and engageable with complemental locking recesses in said tail gate, so as to preclude accessibility to said trunk so long as said tail gate is closed.

9. A trunk adapted for collapse within the floor of an automotive vehicle as in claim 5, said auxiliary side pieces complementally engaging on their inner sides the leading and trailing edges of said side members, said front auxiliary piece leading edge adapted for engagement with the vehicle seat rear and said rear auxiliary piece trailing edge adapted for engagement with the vehicle tail gate.

10. A trunk adapted for collapse within the floor of an automotive vehicle as in claim 9, said top including a handle adjacent its trailing edge.

References Cited

UNITED STATES PATENTS

| | | | |
|---|---|---|---|
| 2,136,972 | 11/1938 | Graunke | 296—24 |
| 2,803,490 | 8/1957 | Ehret | 296—24 X |
| 2,889,097 | 6/1959 | Broehl | 296—37 X |
| 2,934,248 | 4/1960 | Lown | 296—37 X |
| 2,967,037 | 1/1961 | Christle | 108—35 |
| 3,291,520 | 12/1966 | Smith | 296—24 |
| 3,338,620 | 8/1967 | Cauvin | 214—83.24 X |

RICHARD J. JOHNSON, *Primary Examiner.*